May 12, 1925.
T. A. JETT
1,537,825
CAN SOLDERING MACHINE
Filed Jan. 20, 1923
4 Sheets-Sheet 3
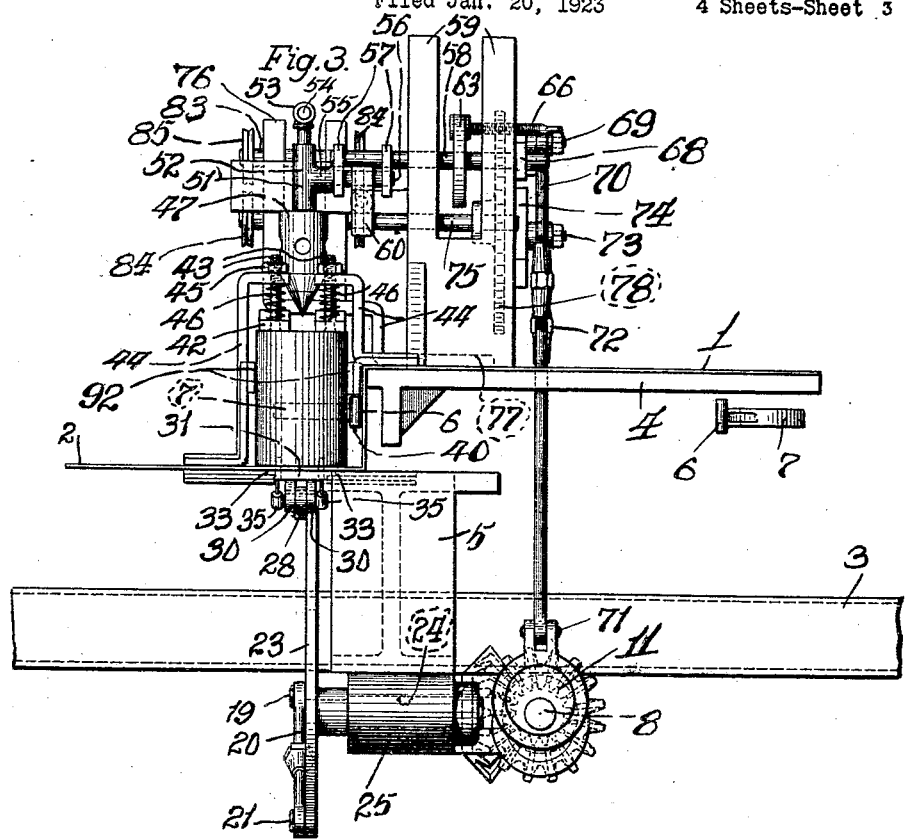
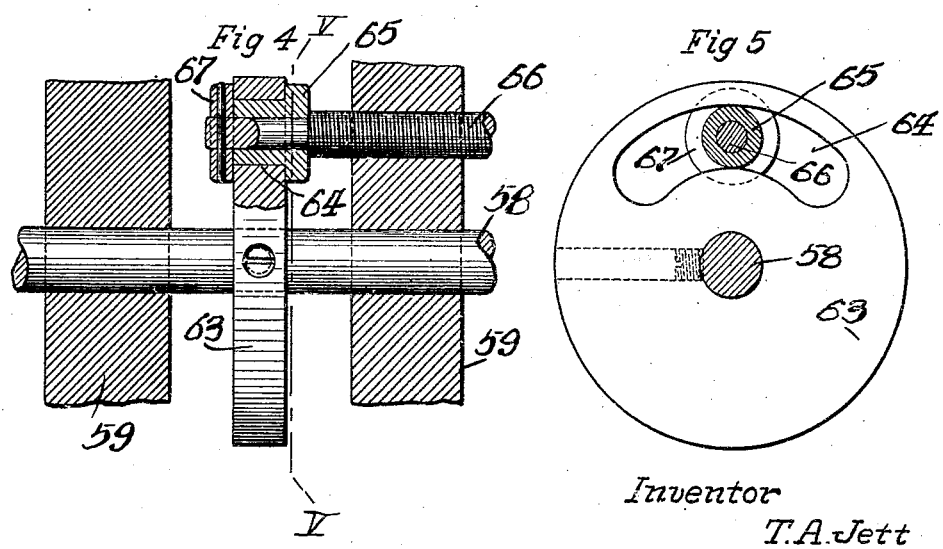
Inventor
T. A. Jett
By H. G. Fletcher Atty May 12, 1925.

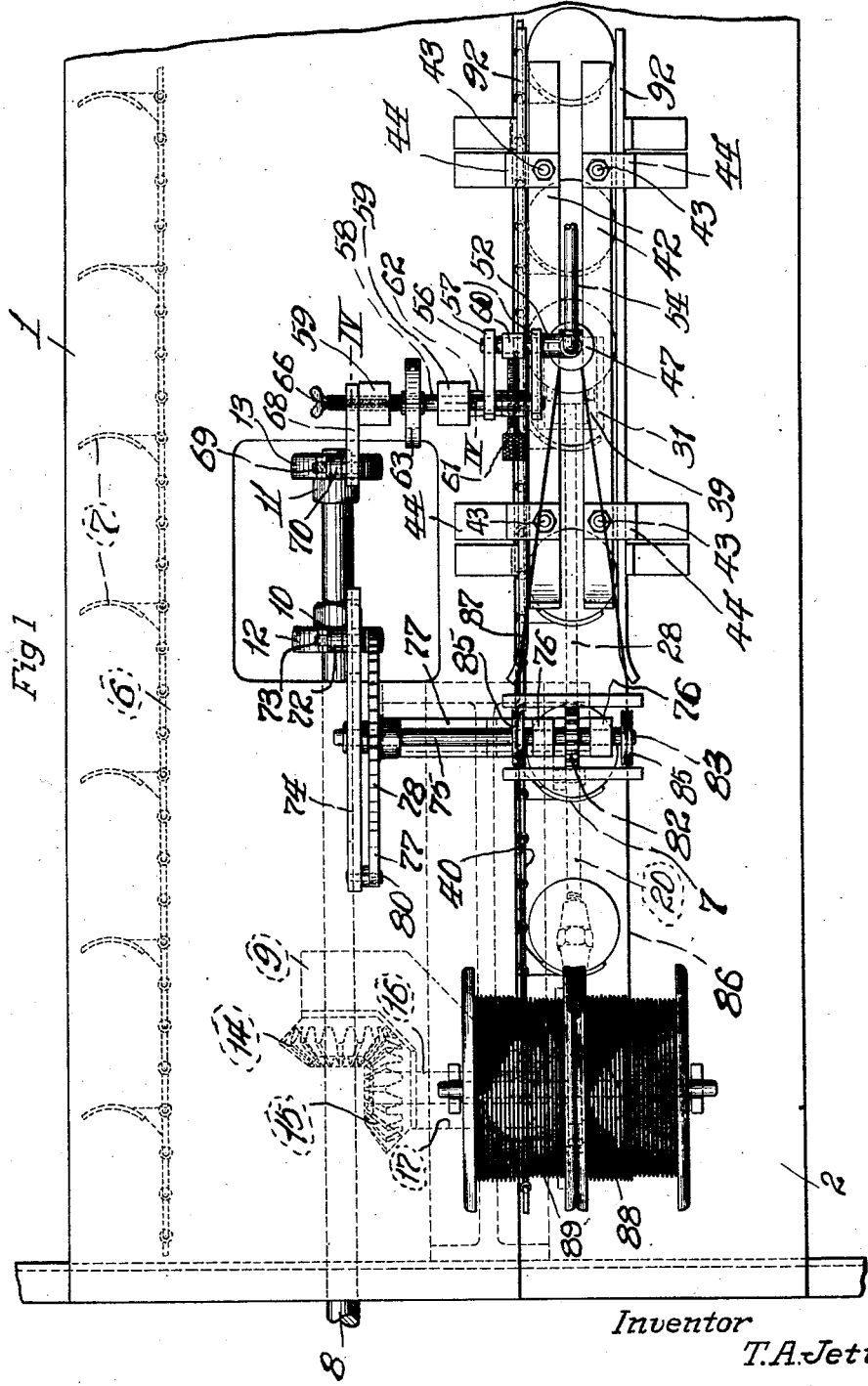

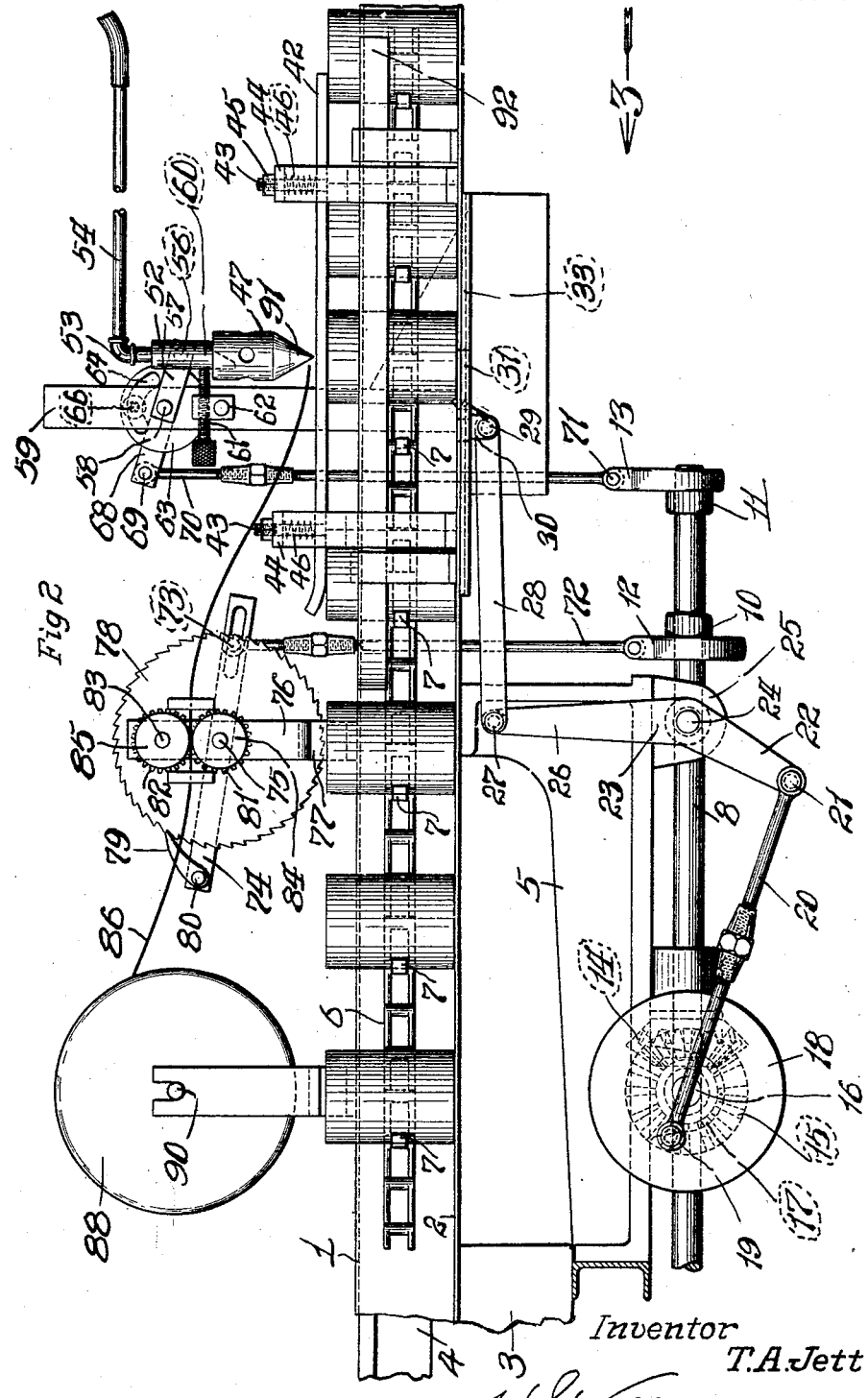

T. A. JETT

CAN SOLDERING MACHINE

Filed Jan. 20, 1923

Inventor
T. A. Jett

By H. G. Fletcher
Atty

Patented May 12, 1925.

1,537,825

UNITED STATES PATENT OFFICE.

THOMAS A. JETT, OF GREENVILLE, ILLINOIS.

CAN-SOLDERING MACHINE.

Application filed January 20, 1923. Serial No. 613,873.

*To all whom it may concern:*

Be it known that I, THOMAS A. JETT, a citizen of the United States of America, and a resident of Greenville, county of Bond, State of Illinois, have invented certain new and useful Improvements in Can-Soldering Machines, of which the following is a specification.

This invention relates to an improvement in soldering machines and has for its primary object the purpose of providing improvements in machines of the character known as tip soldering in which a single opening in the can top of each filled can is tipped and soldered by a single engagement of the soldering tool as each filled can is engaged thereunder.

Another object of the invention is in providing an improvement in a soldering machine in which each can to be tipped is caused to be brought to a stop in its travel while the soldering tool is operating thereon.

A further object of the invention is in providing the soldering tool with a renewable tip or soldering point.

A still further object of the invention is in providing the soldering tool with a soldering point which is made of a particular kind of metal.

Another further object of the invention is to provide improved feeding means for feeding the solder to the soldering tool.

Other and further objects will appear in the specification and be specifically pointed out in the appended claims, reference being had to the accompanying drawings, exemplifying the invention, and in which:—

Figure 1 is a plan view of this improved soldering machine.

Figure 2 is a side elevation of Fig. 1.

Figure 3 is an end elevation of Fig. 2 taken in the direction of arrow 3 in Fig. 2.

Figure 4 is an enlarged fragmentary transverse section taken on the line IV—IV of Fig. 1.

Figure 5 is an enlarged vertical section taken on the line V—V of Fig. 4.

Figure 6:
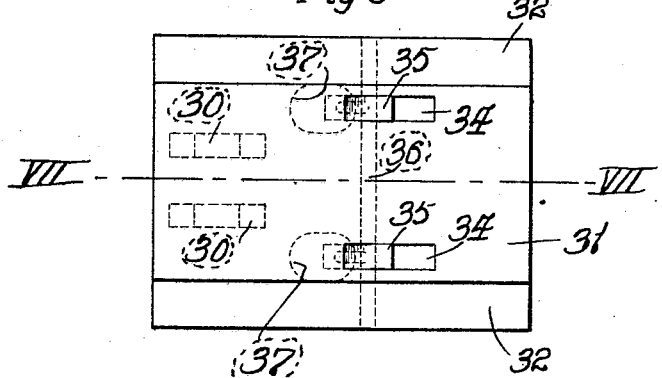
Figure 6 is an enlarged plan view of the can carrying cross-head.
Figure 7:
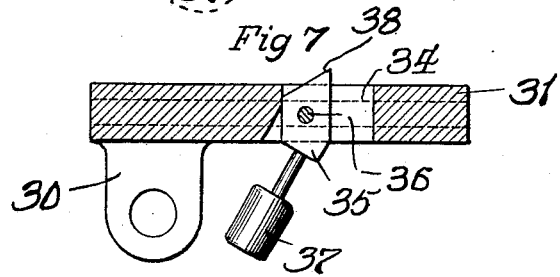
Figure 7 is an enlarged longitudinal section taken on the line VII—VII of Fig. 6.
Figure 8:
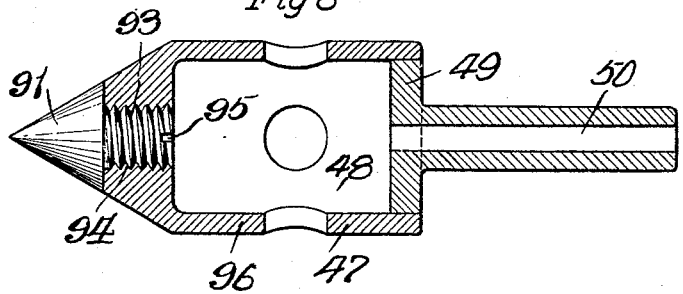
Figure 8 is an enlarged longitudinal section taken through the soldering tool.

This improved soldering machine is comprised of an upper arranged table 1 and a lower arranged table 2, said tables being supported from one end of a can filling machine 3 by respective brackets, such as 4 and 5 which are extended from the can filling machine, and adapted to travel beneath the table 1 and above the table 2 is an endless horizontally traveling conveyor 6 which is provided with a plurality of outwardly extending equi-distant spaced apart can engaging portions 7.

Longitudinally extended beneath the tables 1 and 2 is a drive-shaft 8, said shaft being adapted to receive its driving motion from the can filling machine, said shaft being supported in bearings such as 9 and is provided with a pair of eccentrics 10 and 11, and mounted around the eccentric 10 is an eccentric strap 12, the eccentric 11 being provided with an eccentric strap 13.

Securely mounted on the drive-shaft 8 is a bevel gear 14 and in mesh with said gear is a matching gear 15, said gear 15 being secured to a stub-shaft 16 which is supported in a bearing 17, said bearing being depended from the bracket 5, and secured to the opposite end of said shaft is a disk 18 bearing a horizontally projecting throw-pin or crank 19.

Mounted on the pin 19 is one end of a connection rod 20, the opposite end of said rod being mounted on a pin 21 which is extended from the lower branch 22 of a rocker arm 23, said rocker arm being secured to a short shaft 24 which is supported in a bearing 25 depended from the bracket 5.

The upper extending branch 26 of the rocker arm 23 is provided with a horizontally extending pin 27, and mounted on said pin is a connecting rod 28, the opposite end of said rod being secured at 29 between a pair of depending lugs 30 of a can carrying cross-head 31. The cross head 31 is provided with an oppositely disposed pair of guiding portions 32 each of which are reciprocal within a respective guide-way 33 which are located beneath the table 2.

The cross-head 31 is provided with a pair of oppositely disposed openings 34, and mounted within each of said openings is a self-balancing dog 35, each of said dogs being mounted on a horizontally extending pin 36 which is supported by the cross-head 31 each dog having a lowered arranged weighted end 37 and an upper projecting portion 38 which extends through each respective opening 34.

Arranged between the guide ways 33 and formed in the table 2 are a pair of oppositely disposed longitudinally extending slots 39, each of said slots being for the reception of a projecting end 38 of a respective dog 35, said extending ends of said dogs adapted to extend a short distance above the top of the table 2.

Arranged above the conveying side 40 of the conveyor 6 and paralleling said conveyor are a pair of spaced apart horizontally extending pressure bars 42, each of said bars being supported by a respective pair of vertically extending bolts 43 which are reciprocal within respective brackets 44, said bolts being suspended from their respective brackets by respective nuts 45. A coil spring 46 is mounted on each bolt 43, each spring bearing against its respective pressure bar 42 and bracket bar 44.

Vertically depended above the pressure bars 42 and arranged centrally thereof is a soldering tool 47, said tool being provided with a heating chamber 28 and for closing one end of said chamber is a head 49 forming part of a tubular extension 50. The tubular extension 50 is mounted within the vertical portion 51 of a T-fitting 52 and secured to the upper end of said extension is an L 53 to which a gas supply line 54 is connected.

Extended from the horizontal portion 55 of the T-fitting 52 is a short shaft 56, said shaft being rigidly secured to said fitting and turnably within a pair of arms 57, said arms being rigidly extended from a rock shaft 58 which is turnably supported within a pair of vertically extending supports 59 which are in turn supported from the table 1.

Depended from the short-shaft 56 between the pair of arms 57 is a guiding member 60, said member being rigidly secured to said shaft and is engaged on one side by a set screw 61 which is supported from the extending portion 62 which extends horizontally from the supports 59, as shown in Figs. 1 and 2.

Rigidly secured to the rock shaft 58 between the supports 59 is a disk 63 which is provided with an arcuate slot 64 and mounted within said slot is a shoulder bushing 65 and passing through said bushing is one end of a thumb set screw 66 and for holding said set screw within said bushing is a keyed washer 67. The thumb set screw 66 is threadingly engaged with one of the supports 59, and when operated is adapted to longitudinally shift the rock shaft 58 by reason of its engagement with the disk 64.

Extending from one end of the rock shaft 58 is a throw arm 68 and connected to the outer end of said arm at 69 is one end of a connecting rod 70, said rod at its opposite end being secured at 71 to the eccentric strap 13 of the eccentric 11 which is carried by the drive-shaft 8.

Extending upwardly from the eccentric strap 12 is a connecting rod 72, the upper end of said rod being adjustably secured at 73 to a rocker arm 74 which is swingable upon a horizontally extending shaft 75, said shaft being supported in a pair of vertically extending members 76 which extend from a bracket 77, said bracket being supported from the table 1. Rigidly secured to the shaft 75 adjacent the rocker arm 74 is a ratchet wheel 78 and for engagement with the teeth of said wheel is a pawl 79 which is swingably secured at 80 to the rocker arm 74, and rigidly secured to said shaft between the members 76 is a gear 81, said gear being in mesh with the gear 82 which is rigidly secured to a short shaft 83 which is also supported by the members 76.

Borne by the shaft 75 are a pair of grooved guiding rollers 84, each of said rollers being in opposite disposition to a respective grooved roller 85, said rollers 85 being borne by the short shaft 83, each pair of opposing rollers 84 and 85 being arranged in close proximity to each other so as to provide guiding and feeding agents for the soldering material of which there are two strands 86 and 87 which are fed from respective drums 88 and 89 which are arranged on the shaft 90.

In the operation of this improved soldering machine, filled cans are brought from the can filling machine by the conveying side 40 of the conveyor 6, said filled cans being moved on the surface of the table 2, said conveyor deriving its travelling motion from means (not shown) which may be geared from the can filling machine and coincident with the traveling of the conveyor 6 the driving shaft 8 is operated thereby imparting motion to the stub shaft 16 through the gears 14 and 15, thereby imparting motion to the disk 18 and throw pin 19. On account of the connecting rod 20 being secured at one end to the pin 19 and at its opposite end to the rocker arm 23, rocking motion will be imparted to said arm and cause the connecting rod 28 to be reciprocated, and inasmuch as said rod 28 is connected to the cross head 31, said cross head will be reciprocated in the guide ways 33.

As the filled cans are being moved along the table 2 by engagement of the can engaging portions 7 of the conveyor 6 therewith and in which said cans are moved along said table in spaced apart positions, the upper projecting ends 38 of the pair of dogs 35 carried by the cross head 31 will engage each can as each can is brought up to a position wherein it will be engaged by said dogs at the end of the rearward stroke of the cross head 31. The cross head 31 is designed to travel at a greater speed than the conveyor 6 and after a can has been engaged by the extending ends of the dog 35, the cross head 31 is moved forwardly thereby forcing the can forwardly and away from the can engaging portion 7 of the conveyor, said cross head conveying the engaged can forwardly until it has reached the end of its forward stroke, said cross head on its return stroke leaving the can moved thereby in a stopped position directly beneath the soldering tool 47. Immediately after the filled can has been deposited beneath the soldering tool, the eccentric 11 which is located on the drive-shaft 8 will cause the rock shaft 58 to be rocked thereby lowering the arms 57 which sustain the soldering tool 47, said soldering tool being directed in its travel to the centrally arranged opening formed in the can top by engagement of the guiding member 60 with the set screw 61, the soldering point 91 of said tool while descending engaging both of the soldered lengths 86 and 87, as shown more clearly in Figs. 1 and 2, said tool depositing the solder over the can opening or aperture.

It is obvious that as soon as solder has been deposited from the tool 47 over the can opening which is to be soldered, said tool will be elevated by the action of the eccentric 11 upon the connecting rod 70 and rock shaft 58, and as soon as the tool has become disengaged from the can, the can engaging portion 7 from which the can was disengaged by actuation of the dogs 35 of the cross head 31, the soldered or sealed can will be again engaged by its respective can engaging portion 7 and moved forwardly from beneath the soldering tool.

As the cross head 31 was moved rearwardly after the depositing of the can referred to beneath the soldering tool, the projecting ends 38 of the dog 35 will engage the bottom of the next can in the order of travel, the weight of said can causing the dogs 35 to swing as the cross head 31 is moved thereunder, but as soon as the projecting ends 38 of the dogs become disengaged from beneath the bottom of the can they will immediately be swung upwardly by the balancing weights thereof, so that said projecting ends of the dogs will engage the lower edge of the next can in order when the cross end reaches the end of its rearward stroke. In the next forward travel of the cross head 31 the second can in order will be carried forwardly away from its respective can engaging portion 7 of the conveyor 6 and be deposited beneath the soldering tool 47 so that the aperture thereof can be sealed or soldered by engagement of the soldering tool thereto in the manner as was the first can above mentioned.

For properly positioning cans beneath the soldering tool 47, side guiding members 92 are provided, and for firmly seating the cans on the table 2 as they are brought up by the soldering iron and during the operating of the iron thereon, the pressure bars 42 are provided.

As the soldering tool 47 is moved upwardly after a solder operation, the solder lengths 86 and 87 are fed forwardly in the path of travel thereof. The feeding forward of the soldering lengths 86 and 87 is intermittent and is brought about by actuation of the eccentric 12 of the drive shaft 8 operating upon the connecting rod 72 and rocker arm 74, said rocker arm causing the pawl 79 to engage a ratchet tooth of the ratchet wheel 78 and turn said wheel. During the intermittent turning of the ratchet wheel 78 the gear 81 which is in mesh with the gear 82 will cause said gears to be turned and the opposing grooved rollers 84 and 85 will be operated in pairs therewith thereby feeding the solder lengths 86 and 87 to the soldering tool.

When it is desired to laterally adjust the soldering tool 47, the thumb set screw 66 is engaged and manipulated and the disk 63 to which said thumb screw is extended will be moved and cause the shaft 58 to be moved, said lateral adjustment being for the purpose of properly positioning the soldering point 91 of the tool in direct alinement with the can aperture to be soldered.

The soldering point 91 is provided with a threaded shank 93, said shank being engaged in the threaded opening 94 which is formed in the tool, said threaded shank providing means for removing the soldering point for the purpose of renewal. The renewal operation is brought about by driving the body of the soldering tool from the head 49 of the tubular extension 50, and engaging a screw driver in the heating chamber 48 of the tool and seating the point of the screw driver in the slot 95 of the shank 93, thereby forcing the soldering point 91 from the soldering tool. A new soldering point is then inserted in the opening 94 of the soldering tool.

The soldering point 91 is special in the specific kind of material from which it is made, said material being Monel metal and the holder or body portion 96 of the tool being cast iron. In the use of Monel metal as a soldering engaging point for soldering tools, it has been found that the Monel point will retain and hold a maximum amount of solder as against other metals which will invariably drop or lose an amount of the solder.

What I claim is:

1. In a soldering machine, the combination of a soldering tool, a table, means for conveying articles along said table to a point adjacent said tool, and other means having a portion extend above said table for placing the articles directly adjacent said tool, said tool being restricted to a vertical movement with respect to the table.

2. In a soldering machine, the combination of a soldering tool limited in its motion to a vertical movement, continually moving means for conveying articles towards said tool, and other means for receiving the articles singly from said first mentioned means and placing them in a stopped position adjacent said tool.

3. In a soldering machine, the combination of a soldering tool limited in its motion to a vertical movement, continually moving means for conveying articles towards said tool, and other means for receiving the articles singly from said first mentioned means and placing them in a stopped position adjacent said tool, the first said mentioned means adapted to reengage the article after being engaged by said second mentioned means.

4. In a soldering machine, the combination of a soldering tool, a continually traveling conveyor for moving articles towards said tool, and a reciprocating element arranged in the path of travel of said conveyor adapted to travel at a speed greater than said conveyor in the direction of travel of said conveyor, said element adapted to singly receive the articles from said conveyor and move them forwardly to a point adjacent said tool.

5. In a soldering machine, the combination of a vertically suspended soldering tool, a trackway arranged beneath said tool, a conveyor adapted to travel along said trackway on a plane thereabove, a reciprocal member adapted to operate along said trackway adjacent said tool, said reciprocal member adapted to receive articles singly from said conveyor and move each article forwardly of its position of engagement with said conveyor to a stopped position beneath said tool, said tool being prevented from moving in the direction of travel of the articles.

6. In a soldering machine, the combination of a vertically suspended soldering tool, a trackway arranged beneath said tool, a conveyor adapted to travel along said trackway, a reciprocal member adapted to operate along said trackway adjacent said tool, said reciprocal member adapted to receive articles singly from said conveyor and move each article forwardly of its position of engagement with said conveyor to a stopped position beneath said tool so that the article can be operated on by said tool, said conveyor adapted to re-engage and convey the article after the article has been operated on by said tool, said tool being prevented from moving in the direction of travel of the articles.

7. In a soldering machine, the combination of a vertically suspended reciprocal soldering tool, a conveyor adapted to horizontally travel beneath said tool provided with a series of spaced apart can engaging members, a trackway above which said conveyor travels, a reciprocal member adapted to travel at a speed faster than said conveyor having a projection extending above said trackway, said projection of said reciprocal member adapted to engage each can and move it forwardly of its respective can engaging member to a stopped position beneath said tool, said tool being limited to an up-and-down movement.

8. In a soldering tool, the combination of a vertically suspended reciprocal soldering tool, a conveyor adapted to horizontally travel beneath said tool provided with a series of equally spaced apart can engaging members, a trackway above which said conveyor travels, a slidable member arranged longitudinally of said trackway having a pair of releasable projections which extend above said trackway, said slidable member being reciprocal in the direction of travel of said conveyor and adapted to travel at a greater speed than said conveyor, said projections of said slidable member adapted to engage each can and move it from engagement with its respective can engaging member of said conveyor and carry said can forwardly to a position beneath said tool, said tool being limited to an up-and-down movement.

9. In a soldering machine, the combination of a soldering tool limited in its movement to a vertical motion, a table, a horizontally traveling conveyor arranged on a plane above said table having outwardly extending can engaging portions arranged at equal distances apart, said table being provided with a longitudinal slot, a reciprocating member having a portion extending through the slot of said table, said extending portions of said conveyor adapted to engage and convey cans along said table to a point adjacent said tool, said portion of said reciprocating member adapted to engage each can and carry it along said table to a stopped position directly beneath said tool.

10. In a soldering machine, a soldering tool, a swingable frame for the support of said tool, adjusting means laterally operative on said frame, said tool being limited to an up-and-down movement, and guiding means for holding said tool in vertical alinement as it is reciprocated by the swinging of said frame.

11. In a soldering machine, the combination of a soldering tool restricted to a vertical movement only, means for conveying articles to a point adjacent said tool, and other means for placing the articles directly beneath said tool, said first mentioned means adapted to re-engage each article after each article has been engaged by said second mentioned means.

THOMAS A. JETT.